(12) United States Patent
Wood

(10) Patent No.: US 7,971,162 B2
(45) Date of Patent: Jun. 28, 2011

(54) VERIFICATION OF SPARE LATCH PLACEMENT IN SYNTHESIZED MACROS

(75) Inventor: Michael Hemsley Wood, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 12/032,841

(22) Filed: Feb. 18, 2008

(65) Prior Publication Data

US 2009/0210832 A1      Aug. 20, 2009

(51) Int. Cl.
   *G06F 17/50* (2006.01)
(52) U.S. Cl. ....................................................... 716/100
(58) Field of Classification Search .................. 716/1, 4, 716/100
See application file for complete search history.

(56) References Cited

U.S. PATENT DOCUMENTS

| | | | |
|---|---|---|---|
| 6,427,225 B1 | 7/2002 | Kitada | |
| 6,502,222 B1 * | 12/2002 | Tetelbaum | 716/4 |
| 6,594,805 B1 | 7/2003 | Tetelbaum | |
| 6,751,786 B2 | 6/2004 | Teng | |
| 7,058,914 B2 | 6/2006 | Smith | |
| 7,168,056 B2 | 1/2007 | Dong | |
| 7,328,416 B1 * | 2/2008 | Yin et al. | 716/6 |
| 2004/0080334 A1 * | 4/2004 | Vergnes | 326/10 |
| 2006/0066357 A1 * | 3/2006 | Inoue | 326/93 |
| 2008/0320430 A1 * | 12/2008 | Tsapepas et al. | 716/11 |
| 2009/0193376 A1 * | 7/2009 | Alpert et al. | 716/9 |

* cited by examiner

*Primary Examiner* — Jack Chiang
*Assistant Examiner* — Suchin Parihar
(74) *Attorney, Agent, or Firm* — William A. Kinnaman, Jr.

(57) ABSTRACT

A method to assess spare latch placement in a macro, the method comprises steps of: determining a location for each spare latch in the macro; examining local clock buffers associated with the macro to locate any local clock buffers without a spare latch directly attached to clock nets driven by said local clock buffer; measuring a distance between each of the local clock buffers without spare latches and a closest spare latch; running statistics for the local clock buffers from the measuring step; and locating macros with inadequate spare latch placement using the statistics.

6 Claims, 2 Drawing Sheets

VERIFICATION OF SPARE LATCH PLACEMENT IN SYNTHESIZED MACROS

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of electronic circuit design and more particularly relates to the field of spare latches in the design.

BACKGROUND OF THE INVENTION

An integrated circuit employing synchronous logic may include thousands of units ("syncs") such as logic macros, registers, latches, and flip-flops that are clocked by a clock signal. Macros that are created using synthesis frequently include spare latches that can be used with metal-only electronic circuits on a microprocessor. In creating these macros, the synthesis process displays no preference in placing these spare latches since they have no timing critical paths. In the past it has been observed that these latches can end up in clusters rather than distributed. To be of use for electronic circuits it is necessary to make sure that the spare latches are evenly distributed throughout the macro.

Currently, to solve this problem, engineers manually go into each macro and visually inspect the placement. Obviously, this is tedious and cumbersome.

There is a need for a better latch placement method to overcome the shortcomings of the prior art.

SUMMARY OF THE INVENTION

Briefly, according to an embodiment of the invention a method comprises steps or acts of: determining a location for each spare latch in the macro; examining local clock buffers associated with the macro to locate any local clock buffers without a spare latch directly attached to clock nets driven by said local clock buffer; measuring a distance between each of the local clock buffers without spare latches and a closest spare latch; running statistics for the local clock buffers from the measuring step; and locating macros with inadequate spare latch placement using the statistics.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
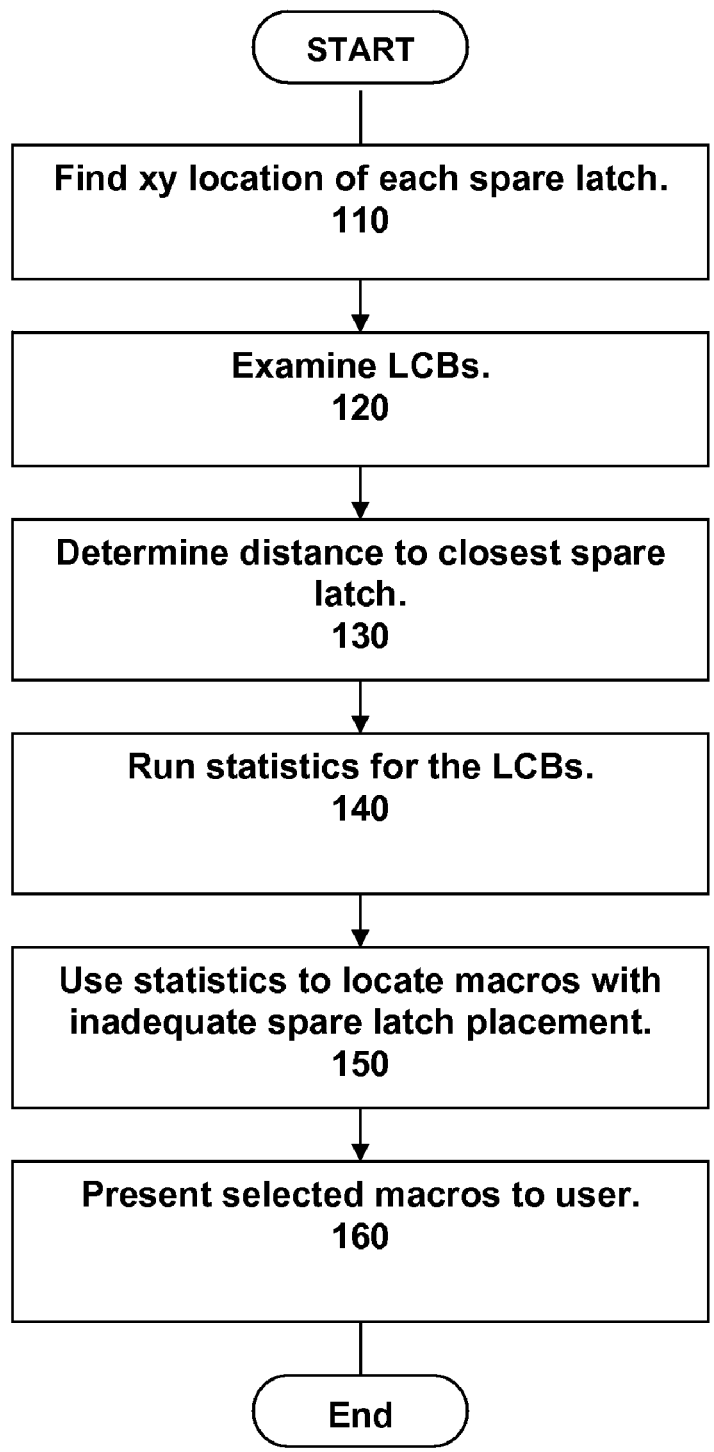
FIG. 1 is a flowchart of a method according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a method to verify spare latch placement in a synthesized macro. We provide a quantitative measure of the latch distribution, focusing on the clustered latches. In addition, we provide automated checking of this criterion. To assess distribution of spare latches, we first need to find the distance from all local clock buffers (LCBs) to the closest spare latches. The distance from existing LCBs is used since any change to latch placement should be done using the existing LCBs. This is because when using spare latches the silicon is frozen and adding additional LCB's is no longer possible. In addition, adding additional LCBs with the additional power consumption is undesirable.

Macros are deemed unacceptable if the distance from any LCB exceeds some criteria. The criteria can be set in a number of different ways. Local clocks have a maximum distance that they can be routed to meet overall chip frequencies. Alternatively, the criteria can be set by looking at the overall distribution of distances and looking for distances that fall beyond the normal statistical bounds.

This method has the additional advantage of highlighting macros that do not have enough spare latches. In certain cases it also highlights macros where latches need to be added to certain clock domains.

Referring now in specific detail to the drawings, and particularly FIG. 1, there is illustrated a flow chart of the process for evaluating the location of the spare latches. The process begins at step 110 where the xy location of each spare latch is found. These are recorded in the data that contains the shapes that are made into masks.

Next in step 120 the LCBs are examined to detect only those LCBs that do not have a spare latch directly attached to the clock nets driven by that LCB. In step 130 each LCB without spare latches is then characterized by the distance to the closest spare latch. Statistics are then run for all of these LCBs in step 140. In step 150 these statistical measures are then used to locate those macros that have inadequate spare latch placement. Lastly, in step 160 the macros with inadequate latch placement are presented to a user. In one embodiment of the present invention, the selected macros are highlighted so that they are distinct from the other macros.

Figure 2:
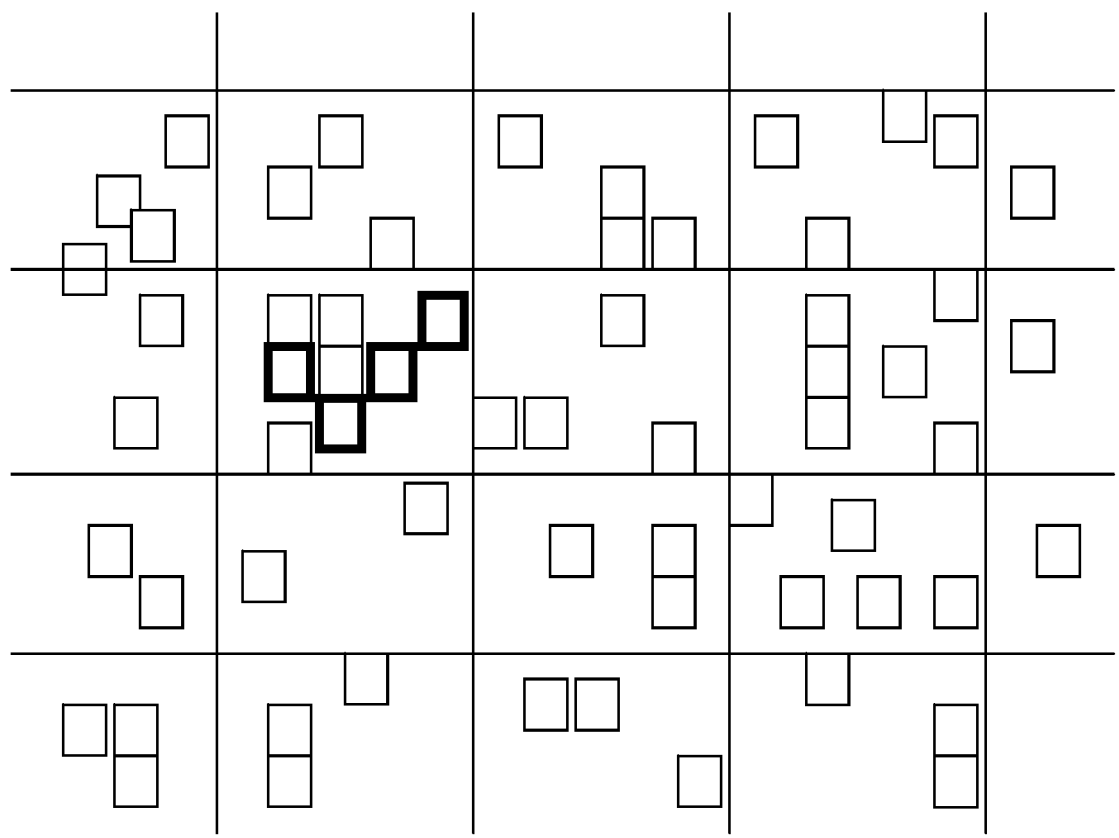
FIG. 2 is a simplified illustration of highlighted macros with inadequate latch placement, according to an embodiment of the present invention.

Referring now to FIG. 2 there is shown a simplified illustration of one embodiment wherein the selected macros are indicated by highlighting (shown as bold in the figure).

Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodi-

I claim:

1. A method to assess spare latch placement in a macro, the method comprising steps of:
    using a processor for determining a location for each spare latch in the macro;
    examining local clock buffers associated with the macro to locate any local clock buffers without a spare latch directly attached to clock nets driven by said local clock buffer;
    measuring a distance between each of the local clock buffers without spare latches and a closest spare latch;
    running statistics for the local clock buffers from the measuring step, wherein the statistics relate to a measured distance between the local clock buffers and the spare latches;
    locating macros with inadequate spare latch placement using the statistics, by:
    surpassing a bound on chip frequency performance and surpassing a maximum number of allowed latches in a clock domain;
    setting a criterion for a maximum distance between each local clock buffer, without spare latches and a closest spare latch, wherein setting the criterion for maximum distance comprises:
        setting a local clock to be routed to meet overall chip frequencies;
        calculating an overall distribution of distances; and
        looking for distances that fall beyond normal statistical bounds; and
    loading the spare latches that meet the criterion to the macro.

2. The method of claim 1 run on random logic macros.

3. The method of claim 1 further comprising alerting a user to those macros with inadequate spare latch placement.

4. The method of claim 3 wherein alerting the user comprises highlighting the macros with inadequate spare latch placement.

5. A system for assessing spare latch placement in a macro, the system comprising:
    a processor;
    a memory operatively coupled with the processor, the memory comprising logic that causes the processor to:
        determine a location for each spare latch in the macro;
        examine local clock buffers associated with the macro to locate any local clock buffers without a spare latch directly attached to clock nets driven by said local clock buffer;
        measure a distance between each of the local clock buffers without spare latches and a closest spare latch;
        run statistics for the local clock buffers from the measuring step, wherein the statistics relate to a measured distance between the local clock buffers and the spare latches; and
        locate macros with inadequate spare latch placement using the statistics; and
    a display for presenting to a user a representation of the macros with inadequate spare latch placement, wherein inadequate spare latch placement requires surpassing a bound on chip frequency performance and surpassing a maximum number of allowed latches in a clock domain, wherein setting the criterion for maximum distance comprises:
    calculating an overall distribution of distances; and
    looking for distances that fall beyond normal statistical bounds.

6. The system of claim 5 wherein the macro is a synthesized macro.

* * * * *